United States Patent
Nejati et al.

(10) Patent No.: US 10,204,216 B2
(45) Date of Patent: Feb. 12, 2019

(54) VERIFICATION METHODS AND VERIFICATION DEVICES

(71) Applicant: Singapore University of Technology and Design, Singapore (SG)

(72) Inventors: Hossein Nejati, Singapore (SG); Ngai-Man Cheung, Singapore (SG); Dawn C. I. Koh, Singapore (SG); Ricardo D. Sosa Medina, Singapore (SG)

(73) Assignee: SINGAPORE UNIVERSITY OF TECHNOLOGY AND DESIGN, Singapore (SG)

( * ) Notice: Subject to any disclaimer, the term of this patent is extended or adjusted under 35 U.S.C. 154(b) by 80 days.

(21) Appl. No.: 15/121,065

(22) PCT Filed: Feb. 24, 2015

(86) PCT No.: PCT/SG2015/000052
§ 371 (c)(1),
(2) Date: Aug. 24, 2016

(87) PCT Pub. No.: WO2015/126329
PCT Pub. Date: Aug. 27, 2015

(65) Prior Publication Data
US 2016/0371480 A1    Dec. 22, 2016

(30) Foreign Application Priority Data
Feb. 24, 2014    (SG) .......................... 10201400155W

(51) Int. Cl.
*G06F 21/00* (2013.01)
*G06F 21/36* (2013.01)
(Continued)

(52) U.S. Cl.
CPC ........ *G06F 21/36* (2013.01); *G06F 17/30554* (2013.01); *G06F 17/30867* (2013.01); *G06F 21/31* (2013.01); *G06F 2221/2133* (2013.01)

(58) Field of Classification Search
CPC ...................................................... G06F 21/00
See application file for complete search history.

(56) References Cited

U.S. PATENT DOCUMENTS

2002/0146169 A1* 10/2002 Sukthankar .............. G06K 9/20
382/170
2005/0066201 A1    3/2005 Goodman et al.
(Continued)

OTHER PUBLICATIONS

L. Von Ahn et al.,"Captcha: Using hard AI problems for security", Eurocrypt 2003, 18 pages.
(Continued)

*Primary Examiner* — Josnel Jeudy
(74) *Attorney, Agent, or Firm* — Viering Jentschura & Partner MBB

(57) ABSTRACT

According to various embodiments, a verification method may be provided. The verification method may include: determining a plurality of objects, each object having a property; displaying a representation of each object of the plurality of objects; receiving from a user an input indicating a sequence of the plurality of objects; determining a sequence of the properties of the plurality of objects; and comparing the Determine a plurality of objects, each object having a input with the sequence of the properties of the objects.

24 Claims, 8 Drawing Sheets

(51) Int. Cl.
*G06F 21/31* (2013.01)
*G06F 17/30* (2006.01)

(56) References Cited

U.S. PATENT DOCUMENTS

| | | | |
|---|---|---|---|
| 2011/0041098 A1* | 2/2011 | Kajiya | G06F 3/04815 715/849 |
| 2011/0150267 A1 | 6/2011 | Snelling et al. | |
| 2011/0209076 A1 | 8/2011 | Saxena et al. | |
| 2012/0195517 A1 | 8/2012 | Mittur et al. | |
| 2013/0019278 A1 | 1/2013 | Sun et al. | |
| 2013/0031640 A1 | 1/2013 | Fisk et al. | |

OTHER PUBLICATIONS

J. Yan et al., "Usability of captchas or usability issues in captcha design", in Soups '08, 2008, 9 pages.
L. Von Ahn et al., "Telling humans and computers apart automatically", Commun. ACM, 2004, pp. 57-60, vol. 47, No. 2.
L. Von Ahn et al., "recaptcha: Human-based character recognition via web security measures", Science, 2008, pp. 1465-1468, vol. 321.
Zhu et al., "Attacks and design of image recognition captchas", in CCS '10. ACM, 2010, pp. 187-200.
Rui et al., "Artifacial: Automated reverse turing test using facial features", MMSys, 2004, 24 pages,vol. 9, No. 6.
D'Souza et al., "Avatar captcha: Telling computers and humans apart via face classification", in EIT. IEEE, 2012, pp. 1-6.
Elson et al., "Asirra: a captcha that exploits interest-aligned manual image categorization", in CCS '07, 2007, pp. 366-374.
Misra et al., "Face recognition captchas," AICT, IEEE, 2006, 6 pages.
Hudson, "Pictorial depth perception in sub-cultural groups in africa", The Journal of Social Psychology, 1960, pp. 183-208 ,vol. 52, No. 2.
Palmeri et al., "Visual object understanding", Nature Reviews Neuroscience, 2004, pp. 291-303, vol. 5.
Goswami et al., "Facedcaptcha: Face detection based color image captcha", FGCS, 2012.
Golle, "Machine learning attacks against the asirra captcha", in CCS '08, 2008, pp. 535-542.
Gossweiler et al., "What's up captcha?: a captcha based on image orientation," in WWW'09, 2009, pp. 841-850.
Datta et al., "Imagination: a robust image-based captcha generation system," in Multimedia'05, 2005, pp. 331-334.
Kim et al., "Facecaptcha: a captcha that identifies the gender of face images unrecognized by existing gender classifiers," Multimedia Tools and Applications, 2013, pp. 1-23.
Korayem et al., "Learning visual features for the avatar captcha recognition challenge," in ICMLA, 2012, pp. 584-587, vol. 2.
Yamasaki et al., "Face recognition challenge: Object recognition approaches for human/avatar classification," in ICMLA, 2012, pp. 574-579, vol. 2.

Gevers et al., "Robust histogram construction from color invariants for object recognition", PAMI, 2004, pp. 113-118, vol. 26, No. 1.
Stokman et al, "Selection and fusion of color models for feature detection," IEEE, 2005, pp. 560-565.
Liu et al., "A new approach for color-based object recognition with fusion of color models," in CISP, 2008, pp. 456-460, vol. 3.
Fussenegger et al., "On-line, incremental learning of a robust active shape model," Proc. DAGM-Symp. Pattern Recognit, 2006, pp. 122-131.
Toshev et al., "Shape-based object recognition in videos using 3d synthetic object models", in CVPR, 2009, pp. 288-295.
Zhao et al., "A novel relative orientation feature for shape-based object recognition," in IC-NIDC, 2009, pp. 686-689.
Diplaros et al., "Combining color and shape information for illumination-viewpoint invariant object recognition", IEEE, 2006, 17 pages.
Hu et al., "Active contour-based visual tracking by integrating colors, shapes, and motions," IEEE , 2013, pp. 1778-1792, vol. 22, No. 5.
Wang et al., "Fast object recognition and 6d pose estimation using viewpoint oriented color-shape histogram," in ICME, 2013, pp. 1-6.
Little et al., "Turkit: human computation algorithms on mechanical turk," in Proceedings of the 23nd annual ACM symposium on User interface software and technology. New York, USA: ACM, 2010, pp. 57-66.
Yu et al., "Color texture moments for content-based image retrieval", in ICIP, 2002, pp. 929-932,vol. 3.
Omer et al., "Color lines: Image specific color representation," CVPR, pp. 1-8, 2004.
Konstantinidis et al., "Image retrieval based on fuzzy color histogram processing," Optics Communications, pp. 375-386, 2005.vol. 248, No. 4.
Abdel-Hakim et al., "Csift: A sift descriptor with color invariant characteristics," in CVPR, 2006, pp. 1978-1983, vol. 2.
Pavel et al., "Reliable object recognition using sift features," in MMSP,IEEE, 2009, pp. 1-6.
Wang et al., "Robust image retrieval based on color histogram of local feature regions," Multimedia Tools Appl., pp. 323-345, 2010, vol. 49, No. 2.
Souza et al., "Hue histograms to spatiotemporal local features for action recognition," CoRR, 2011.
Cucchiara et al., "Improving shadow suppression in moving object detection with hsv color information," in ITS, 2001, pp. 334-339.
Hu et al., "Motion objects detection based on higher order statistics and HSV color space," in ICM, 2011, pp. 71-74, vol. 3.
Aadhiirai et al., "Image Captcha: Based on Human Understanding of Real World Distances", 2012 IEEE Proceedings of 4th International Conference on Intelligent Human Computer Interaction, 6 pages.
International Search Report based on application No. PCT/SG2015/000052 (3 pages) dated Apr. 27, 2015 (for reference purpose only).
International Preliminary Report on Patentability based on application No. PCT/SG2015/000052 (5 pages) dated Feb. 1, 2016.

* cited by examiner

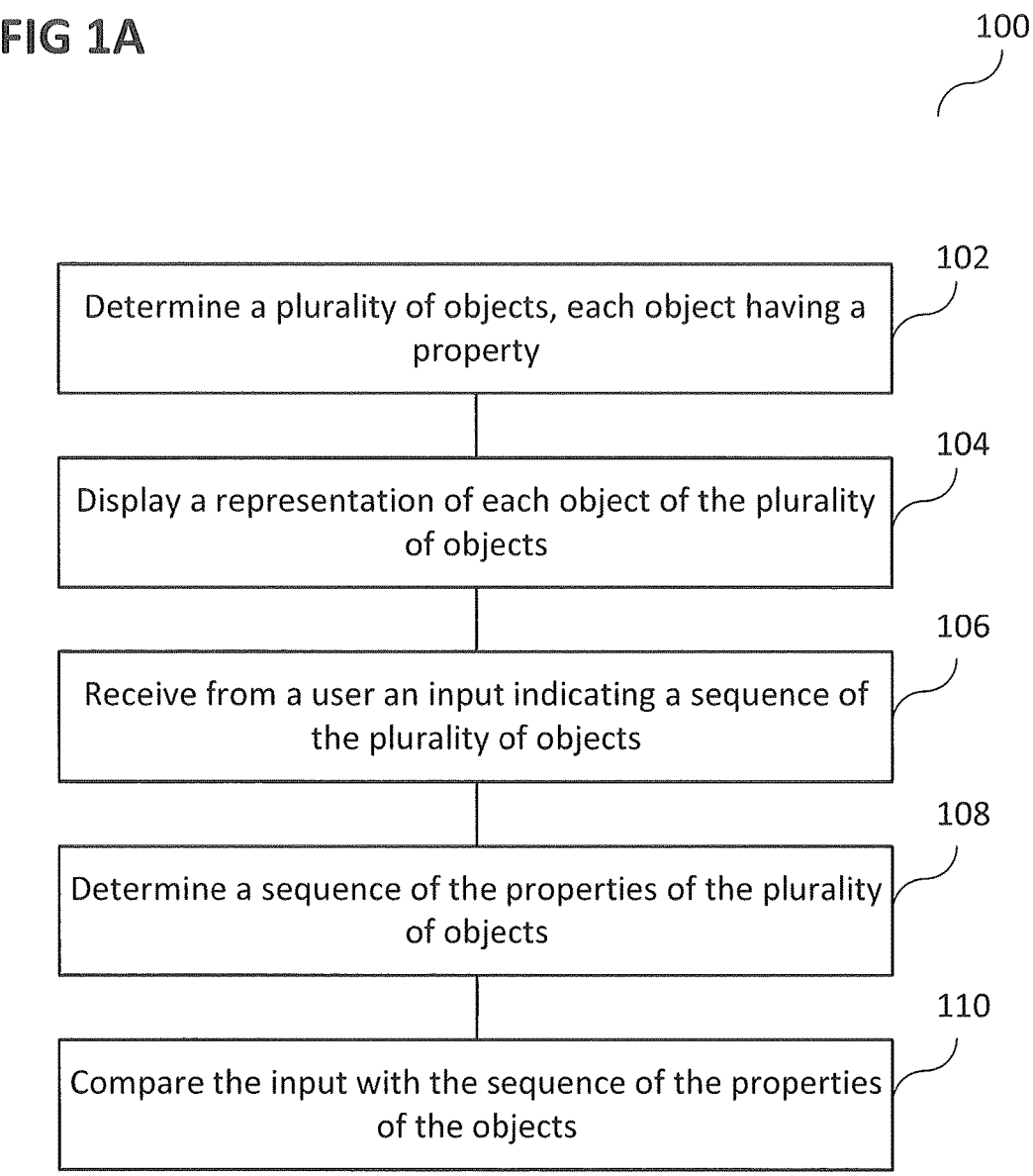

600

VERIFICATION METHODS AND VERIFICATION DEVICES

CROSS-REFERENCE TO RELATED APPLICATIONS

The present application claims the benefit of the Singapore patent application No. 10201400155W filed on 24 Feb. 2014, the entire contents of which are incorporated herein by reference for all purposes.

TECHNICAL FIELD

Embodiments relate generally to verification methods and verification devices.

BACKGROUND

CAPTCHA, standing for "Completely Automated Public Turing test to tell Computers and Humans Apart", is an automatic challenge-response test to distinguish between humans and machines. Over the past decade, text-based CAPTCHA (TBC) have become popular in preventing adversarial attacks and spam in many websites and applications including emails services, social platforms, web-based market places, and recommendation systems. However, in addition to several problems with TBC, it has become increasingly difficult to solve in recent years, to keep up with OCR technologies. Thus, there may be a need for efficient CAPTCHA techniques.

SUMMARY

According to various embodiments, a verification method may be provided. The verification method may include: determining a plurality of objects, each object having a property; displaying a representation of each object of the plurality of objects; receiving from a user an input indicating a sequence of the plurality of objects; determining a sequence of the properties of the plurality of objects; and comparing the input with the sequence of the properties of the objects.

According to various embodiments, a verification device may be provided. The verification device may include: an object determination circuit configured to determine a plurality of objects, each object having a property; a display circuit configured to display a representation of each object of the plurality of objects; an input circuit configured to receive from a user an input indicating a sequence of the plurality of objects; a property sequence determination circuit configured to determine a sequence of the properties of the plurality of objects; and a comparing circuit configured to compare the input with the sequence of the properties of the objects.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 1A shows flow diagram illustrating a verification method according to various embodiments;

DESCRIPTION

Figure 1B:
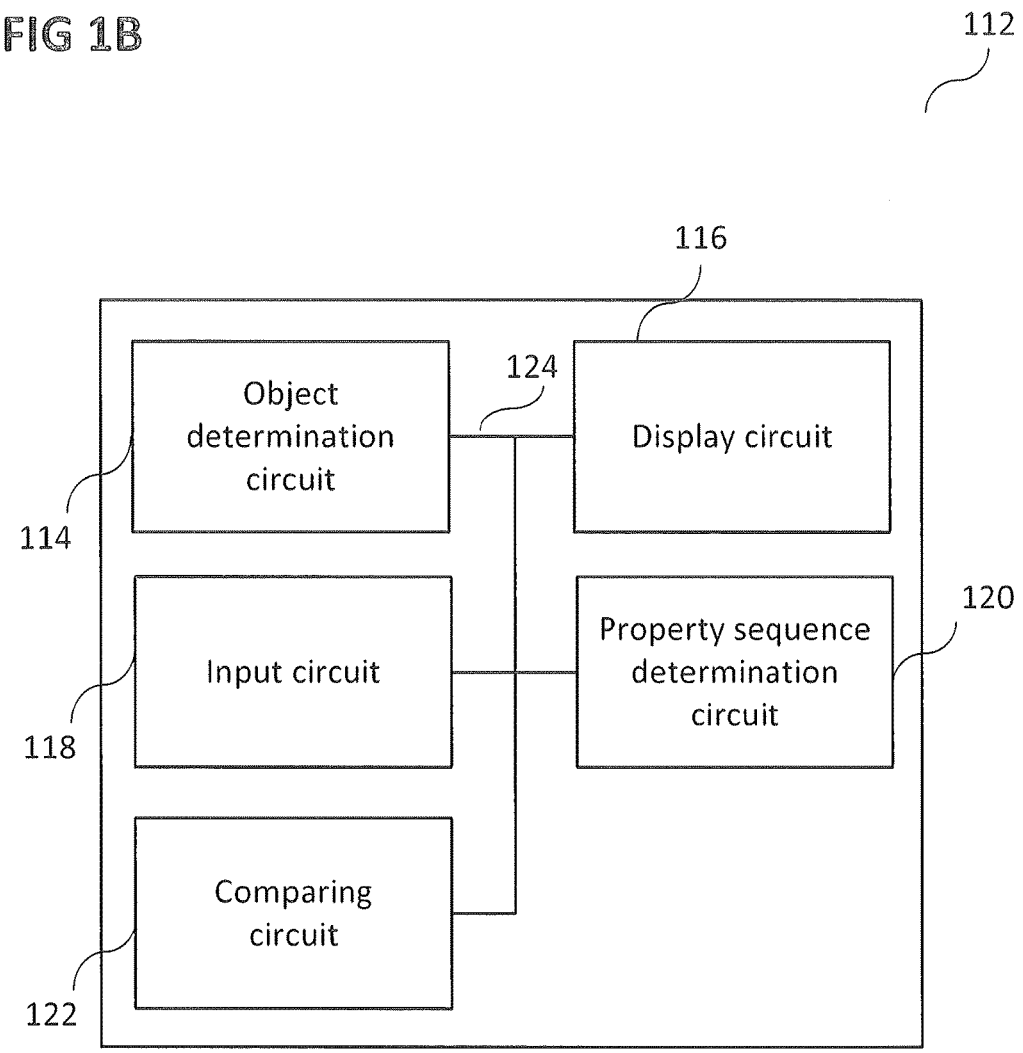
FIG. 1B shows a verification device according to various embodiments.

Embodiments described below in context of the devices are analogously valid for the respective methods, and vice versa. Furthermore, it will be understood that the embodiments described below may be combined, for example, a part of one embodiment may be combined with a part of another embodiment.

In this context, the verification device as, described in this description may include a memory which is for example used in the processing carried out in the verification device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

CAPTCHA, standing for "Completely Automated Public Turing test to tell Computers and Humans Apart", is an automatic challenge-response test to distinguish between humans and machines.

These tests require tasks that are easy for most humans to solve, while being almost intractable for state-of-art algorithms and heuristics. Today's CAPTCHA have two main benefits: (1) they are web-based means to avoid the enrollment of automatic programs in places where only humans are allowed (e.g. email registrations, on-line polls and reviewing systems, social networks, etc.); and (2) they also reveal gaps between human and machine performance in a particular task. Efforts to close these gaps by artificial intelligence (AI) researchers make CAPTCHA an evolving battle field between designers and researchers.

Over the past decade, text-based CAPTCHA (TBC) have become popular in preventing adversarial attacks and spam in many websites and applications including emails services, social platforms, web-based market places, and recommendation systems. However, in addition to several problems with TBC, it has become increasingly difficult to solve in recent years, to keep up with OCR technologies. Image-based CAPTCHA (IBC), on the other hand, is a relatively new concept that promises to overcome key limitations of TBC.

The most popular type of CAPTCHA is text-based CAPTCHA (TBC), which has been in use for over a decade. The use of TBC has not only helped user security (e.g. in email services) and removing spam (e.g. in review and recommendation systems), but also indirectly helped the improvement of optical character recognition (OCR) technology; and even digitizing a large number of books (for example in the reCAPTCHA project). However in order to stay ahead of optical character recognition technologies, TBCs have become increasingly distorted and complex, thus becoming very difficult to solve for increasing numbers of human users. Common human error include mistaking a consecutive 'c' and 'l' for a 'd', or a 'd' or 'o' for an 'a' or 'b' etc. It is noted that these mistakes may even come from users highly proficient in the Roman alphabet using high-resolution displays. This suggests that TBCs are at the limit of human abilities. In addition, TBCs are inherently restrictive: users need to be literate in the language or the alphabet used in the TBCs. This violates important universal design guidelines, excluding a large proportion of potential users.

In recent years, image-based CAPTCHA (IBC) have been introduced to address the shortcomings of TBCs. These new types of CAPTCHA capitalize on the human innate ability to interpret visual representations, such as distinguishing images of animals (e.g. Animal Pix), scenes (e.g. Pix, and Bongo), or face images (e.g. Avatar CAPTCHA). Therefore, IBCs may address a significantly wider age range and education level (than TBCs), and may be mostly language independent, except for requiring that the instructions for solving the CAPTCHA be conveyed in a language-independent manner, e.g. using diagrams, symbols or video.

IBCs are therefore closer to the universal design ideals, and are also more intuitive for humans than TBCs. On the other hand, any IBC, if not carefully implemented, may suffer from a vulnerability that almost never plagues TBCs: that of exhaustive attacks. A TBC is typically generated "on the fly" by creating a text string from a finite set of symbols (e.g. the Roman alphabet), and then increasing the difficulty to identify the string by applying image distortion filters. Although the alphabet is finite, a virtually infinite set of CAPTCHA may be generated from the string creation combined with the image distortion operation. This makes it intractable for an attacker to exhaustively pre-solve (e.g. by using human solvers) all possible TBCs. By comparison, IBCs typically start with a finite database of image. If these images are used without distortion, as in the case of CAPTCHA The Dog, then an exhaustive attack may be possible. If only simple image distortions are applied, after exhaustive attack, machine can match a distorted image, to previously solved image. Therefore, for any IBC to be viable, it should follow a series of design guidelines to achieve CAPTCHA goals:

[G1:] Automation and gradability.
[G2:] Easy to solve by a large majority of humans.
[G3:] Hard to solve by automated scripts.
[G4:] Universal (adapted from Center for Universal Design)
  1. Equitable: diverse age and culture groups;
  2. Flexibility: customizable for specific target applications;
  3. Intuitive: instructions are easy to understand and follow;
  4. Low effort: low cognitive demands;
  5. Perceptible: visible under sensory limitations, amenable to scale;
  6. Usability: Suitable for a variety of platforms.
[G5:] Resistance to random attacks.
[G6:] Robustness to brute force (exhaustive) attacks.
[G7:] Situated cognition: exploits experiential and embodied knowledge in humans.

A systematic approach to design a CAPTCHA that satisfies the above guidelines is to design the CAPTCHA task (Ctask) based on humans' higher order cognitive skills, and therefore taking advantage of intuitive visual abilities that are hard to pre-solve exhaustively (G7).

According to various embodiments, efficient CAPTCHA techniques may be provided.

FIG. 1A shows flow diagram 100 illustrating a verification method according to various embodiments. In 102, a plurality of objects may be determined. Each object may have a property. In 104, a representation of each object of the plurality of objects may be displayed. In 106, an input indicating a sequence of the plurality of objects may be received from a user. In 108, a sequence of the properties of the plurality of objects may be determined. In 110, the input may be compared with the sequence of the properties of the objects.

In other words, according to various embodiments, a sequence of displayed objects may be input and may be compared with a sequence of properties of the displayed objects.

According to various embodiments, based on this comparison, it may be determined whether the sequence has been input by a human or by a machine.

According to various embodiments, the property of each object of the plurality of objects may include or may be a quantifiable value.

According to various embodiments, determining the sequence of the properties of the plurality of objects may include or may be ordering the properties in ascending order according to the values of the plurality of objects.

According to various embodiments, determining the sequence of the properties of the plurality of objects may include or may be ordering the properties in descending order according to the values of the plurality of objects.

According to various embodiments, comparing the input with the sequence of the properties of the objects may include or may be determining whether the input indicates a sequence of the plurality of objects which matches with the determined sequence of the properties of the plurality of objects.

According to various embodiments, the representation of at least one object of the plurality of objects may include or may be a visualization of a model of the object.

According to various embodiments, the representation of at least one object of the plurality of objects may include or may be a visualization of a two-dimensional model of the object.

According to various embodiments, the representation of at least one object of the plurality of objects may include or may be a visualization of a three-dimensional model of the object.

According to various embodiments, the representation of at least one object of the plurality of objects may include or may be a drawing illustrating the object.

According to various embodiments, the representation of at least one object of the plurality of objects may include or may be a photo showing the object.

According to various embodiments, the representation of at least one object of the plurality of objects may include or may be a video showing the object.

According to various embodiments, the property of at least one object of the plurality of objects may include or may be a property which can be determined based on experience in real world without special training.

According to various embodiments, the property of each object of the plurality of objects may include or may be a size of the object.

According to various embodiments, the property of each object of the plurality of objects may include or may be a speed of the object.

According to various embodiments, the property of each object of the plurality of objects may include or may be an age of the object.

According to various embodiments, the property of each object of the plurality of objects may include or may be a maximum travel distance of the object.

According to various embodiments, the property of each object of the plurality of objects may include or may be a maximum flight height of the object.

According to various embodiments, the property of each object of the plurality of objects may include or may be a temperature of the object.

According to various embodiments, the property of each object of the plurality of objects may include or may be a geographical location of the object.

According to various embodiments, the property of each object of the plurality of objects may include or may be a latitude of the object.

According to various embodiments, the property of each object of the plurality of objects may include or may be a longitude of the object.

According to various embodiments, the property of each object of the plurality of objects may include or may be an altitude of the object.

According to various embodiments, the property of each object of the plurality of objects may include or may be a mass of the object.

According to various embodiments, the property of each object of the plurality of objects may include or may be a price of the object.

According to various embodiments, the property of each object of the plurality of objects may include or may be a power of the object.

According to various embodiments, the property of each object of the plurality of objects may include or may be a computing power of the object.

According to various embodiments, the property of each object of the plurality of objects may include or may be a brightness of the object.

According to various embodiments, the property of each object of the plurality of objects may include or may be a popularity of the object.

According to various embodiments, the property of each object of the plurality of objects may include or may be a wind resistance of the object.

According to various embodiments, the property of each object of the plurality of objects may include or may be a flexibility of the object.

According to various embodiments, the object may include or may be a person.

According to various embodiments, the object may include or may be an animal.

According to various embodiments, the object may include or may be a microorganism.

According to various embodiments, the object may include or may be a virus.

According to various embodiments, the object may include or may be an article.

According to various embodiments, the object may include or may be a building.

According to various embodiments, the object may include or may be a place.

According to various embodiments, the object may include or may be a city.

According to various embodiments, the object may include Or may be a vehicle.

According to various embodiments, the object may include or may be a motorized vehicle.

According to various embodiments, the object may include or may be a car.

According to various embodiments, the object may include or may be a truck.

According to various embodiments, the object may include or may be a computer.

According to various embodiments, the object may include or may be a mobile phone.

According to various embodiments, displaying a representation of an object of the plurality of objects may include or may be changing an appearance of the representation of the object and displaying the representation of the object with the changed appearance.

According to various embodiments, changing the appearance may include or may be translating the representation of the object.

According to various embodiments, changing the appearance may include or may be rotating the representation of the object.

According to various embodiments, changing the appearance may include or may be scaling the representation of the object.

According to various embodiments, changing the appearance may include or may be changing an illumination of the representation of the object.

According to various embodiments, changing the appearance may include or may be changing a coloring of the representation of the object.

According to various embodiments, changing the appearance may include or may be changing a background of the representation of the object.

According to various embodiments, changing the background of the representation of the object may include or may be cluttering the background.

According to various embodiments, the verification method may include or may be a CAPTCHA.

FIG. 1B shows a verification device 112 according to various embodiments. The verification device 112 may include: an object determination circuit 114 configured to determine a plurality of objects, each object having a property; a display circuit 116 configured to display a representation of each object of the plurality of objects; an input circuit 118 configured to receive from a user an input indicating a sequence of the plurality of objects; a property sequence determination circuit 120 configured to determine a sequence of the properties of the plurality of objects; and a comparing circuit 122 configured to compare the input with the sequence of the properties of the objects. The object determination circuit 114, the display circuit 116, the input circuit 118, the property sequence determination circuit 120, and the comparing circuit 122 may be coupled with each other, like indicated by lines 124, for example electrically coupled, for example using a line or a cable, and/or mechanically coupled According to various embodiments, the property of each object of the plurality of objects may include or may be a quantifiable value.

According to various embodiments, the property sequence determination circuit 120 may further be configured to determine the sequence of the properties of the plurality of objects based on ordering the properties in ascending order according to the values of the plurality of objects.

According to various embodiments, the property sequence determination circuit 120 may further be configured to determine the sequence of the properties of the plurality of objects based on ordering the properties in descending order according to the values of the plurality of objects.

According to various embodiments, the comparing circuit 122 may further be configured to compare the input with the sequence of the properties of the objects based on determining whether the input indicates a sequence of the plurality of objects which matches with the determined sequence of the properties of the plurality of objects.

According to various embodiments, the representation of at least one object of the plurality of objects may include or may be a visualization of a model of the object.

According to various embodiments, the representation of at least one object of the plurality of objects may include or may be a visualization of a two-dimensional model of the object.

According to various embodiments, the representation of at least one object of the plurality of objects may include or may be a visualization of a three-dimensional model of the object.

According to various embodiments, the representation of at least one object of the plurality of objects may include or may be a drawing illustrating the object.

According to various embodiments, the representation of at least one object of the plurality of objects may include or may be a photo showing the object.

According to various embodiments, the representation of at least one object of the plurality of objects may include or may be a video showing the object.

According to various embodiments, the property of at least one object of the plurality of objects may include or may be a property which can be determined based on experience in real world without special training.

According to various embodiments, the property of each object of the plurality of objects may include or may be a size of the object.

According to various embodiments, the property of each object of the plurality of objects may include or may be a speed of the object.

According to various embodiments, the property of each object of the plurality of objects may include or may be an age of the object.

According to various embodiments, the property of each object of the plurality of objects may include or may be a maximum travel distance of the object.

According to various embodiments, the property of each object of the plurality of objects may include or may be a maximum flight height of the object.

According to various embodiments, the property of each object of the plurality of objects may include or may be a temperature of the object.

According to various embodiments, the property of each object of the plurality of objects may include or may be a geographical location of the object.

According to various embodiments, the property of each object of the plurality of objects may include or may be comprises a latitude of the object.

According to various embodiments, the property of each object of the plurality of objects may include or may be a longitude of the object.

According to various embodiments, the property of each object of the plurality of objects may include or may be an altitude of the object.

According to various embodiments, the property of each object of the plurality of objects may include or may be a mass of the object.

According to various embodiments, the property of each object of the plurality of objects may include or may be a price of the object.

According to various embodiments, the property of each object of the plurality of objects may include or may be a power of the object.

According to various embodiments, the property of each object of the plurality of objects may include or may be a computing power of the object.

According to various embodiments, the property of each object of the plurality of objects may include or may be a brightness of the object.

According to various embodiments, the property of each object of the plurality of objects may include or may be a popularity of the object.

According to various embodiments, the property of each object of the plurality of objects may include or may be a wind resistance of the object.

According to various embodiments, the property of each object of the plurality of objects may include or may be a flexibility of the object.

According to various embodiments, the object may include or may be a person.

According to various embodiments, the object may include or may be an animal.

According to various embodiments, the object may include or may be a microorganism.

According to various embodiments, the object may include or may be a virus.

According to various embodiments, the object may include or may be an article.

According to various embodiments, the object may include or may be a building.

According to various embodiments, the object may include or may be a place.

According to various embodiments, the object may include or may be a city.

According to various embodiments, the object may include or may be a vehicle.

According to various embodiments, the object may include or may be a motorized vehicle.

According to various embodiments, the object may include or may be a car.

According to various embodiments, the object may include or may be a truck.

According to various embodiments, the object may include or may be a computer.

According to various embodiments, the object may include or may be a mobile phone.

According to various embodiments, the display circuit 116 may be configured to change an appearance of the representation of the object and to display the representation of the object with the changed appearance.

According to various embodiments, the display circuit 116 may be configured to change the appearance by translating the representation of the object.

According to various embodiments, the display circuit 116 may be configured to change the appearance by rotating the representation of the object.

According to various embodiments, the display circuit 116 may be configured to change the appearance by scaling the representation of the object.

According to various embodiments, the display circuit 116 may be configured to change the appearance by changing an illumination of the representation of the object.

According to various embodiments, the display circuit 116 may be configured to change the appearance by changing a coloring of the representation of the object.

According to various embodiments, the display circuit 116 may be configured to change the appearance by changing a background of the representation of the object.

According to various embodiments, changing the background of the representation of the object may include or may be cluttering the background.

According to various embodiments, the verification method may include or may be a CAPTCHA device.

According to various embodiments, a computer readable medium may be provided including program instructions which when executed by a processor cause the processor to perform the verification method as described above.

According to various embodiments, DeepCAPTCHA, which is an image CAPTCHA based on depth perception, may be provided According to various embodiments, an IBC, which may be referred to as Deep-CAPTCHA, may be provided, based on design guidelines, psychological theory and empirical experiments. DeepCAPTCHA may exploit the human ability of depth perception. In the IBC according to various embodiments, users may arrange 3D objects in terms of size (or depth). In a framework for DeepCAPTCHA according to various embodiments, 3D models may be automatically mined, and a human-machine Merge Sort algorithm may be used to order these unknown objects. New appearances for these objects may then be created at multiplication factor of 200, and these new images may be presented to the end-users for sorting (as CAPTCHA tasks). Humans are able to apply their rapid and reliable object recognition and comparison (arisen from years of experience with the physical environment) to solve DeepCAPTCHA, while machines may be still unable to complete these tasks. Experimental results show that humans may solve DeepCAPTCHA with a high accuracy (~84%) and ease, while machines perform dismally.

According to various embodiments, the human's perception of relative size and depth of the complex objects may be exploited to create an IBC. These depth-related visual cues may be intuitively used by the human visual system from early age, and may be applicable to all 3D every-day or well-known objects including representations of animals, man-made objects and characters across multiple scales. Natural objects across scales can range from atoms and molecules to insects, small animals such as mice to human-size animals, to the biggest animals such as elephants, whales and dinosaurs, to natural elements such as mountains, all the way to planets. Likewise, every-day artificial objects can intuitively be classified across scales from millimeters such as earrings, to centimeters such as keys and coins, to human-size such as bicycles and chairs, to a few meters such as houses, to larger objects such as skyscrapers and airplanes, to super-structures like cities.

According to various embodiments, DeepCAPTCHA may be built on the basis of human intuitive ability to distinguish and sort categories of objects based on their size in a very large collection of everyday objects that are familiar across cultures. The simplicity of this task for humans comes from the rapid and reliable object detection, recognition and comparison which arise from years of embodied experience of interacting with the physical environment. Humans can rapidly recognize representations of objects, and using their prior information about the real-world sizes of these objects, order them in terms of size. According to various embodiments, the same principle may be exploited here, having n objects (with an integer number n, for example n=6), and ask the user to order them in terms of size, but the appearances of each object may be changed to the extent that humans can still recognize them, but machines cannot.

DeepCAPTCHA according to various embodiments is an image-based CAPTCHA to address the shortcomings of text-based CAPTCHA, by exploiting human's depth-perception abilities.

Figure 2:
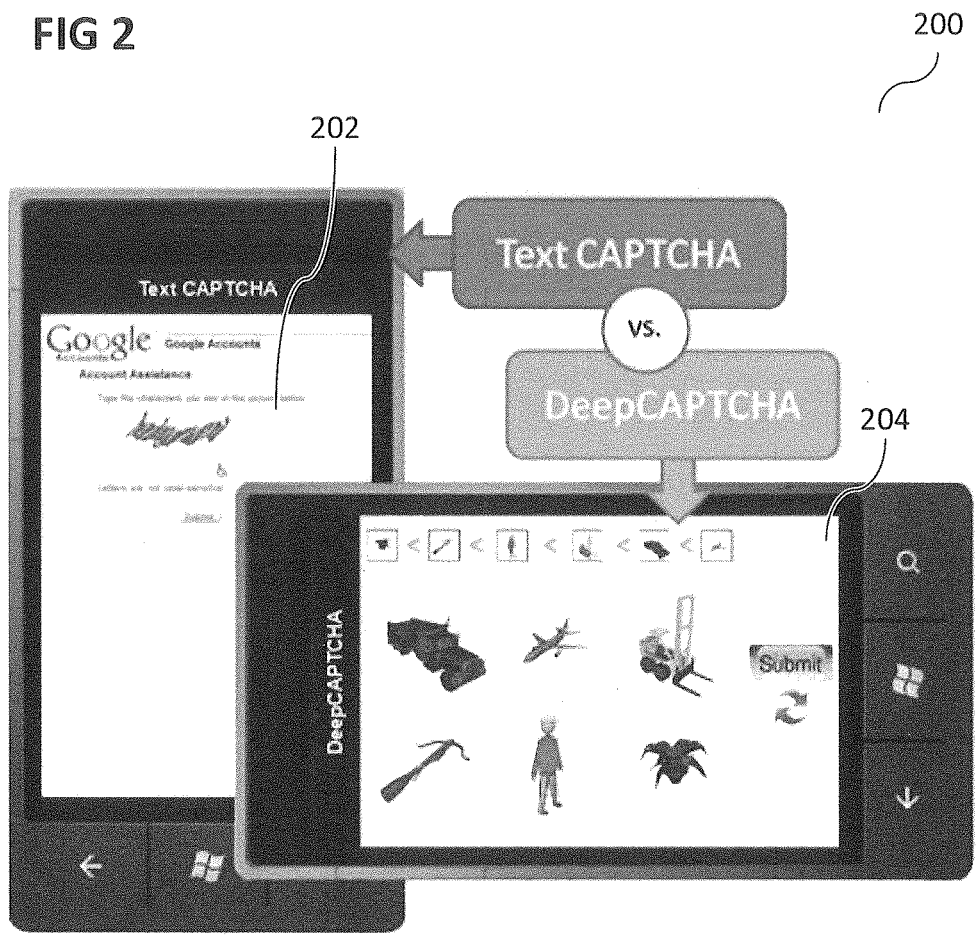
FIG. 2 shows an illustration of an example of a Deep-CAPTCHA task on the user's device in comparison to a text-based CAPTCHA.

FIG. 2 shows an illustration 200 of an example of a DeepCAPTCHA task 204 on the user's device in comparison to a text-based CAPTCHA 202. This seemingly trivial task for humans may be made very difficult for machines as described in more details of the framework according to various embodiments in the following).

According to various embodiments, a CAPTCHA task (Ctask) may be provided with the following properties. The DeepCAPTCHA may (1) address random attacks by a well-designed interface; (2) be immune to exhaustive attacks, even when the database of objects is leaked (3) be robust to machine-solver attacks while keeping the task easy for a wide range human users. In addition, to have an automatically gradable Ctask, (4) the Deep-CAPTCHA system may be able to automatically mine new objects and discover the relative size between them and the rest of database, and finally remove objects with size ambiguity. According to various embodiments, a five-parted framework, build around the core of 3D model analysis and manipulation, may be provided.

According to various embodiments, the choice of 3D models as the core of DeepCAPTCHA framework may enable having full control on object manipulation, and feature analysis. Using 3D model allows appearance alternations at multiplication factor of 200, without compromising the ease of recognition by human. This is remarkable and impossible to achieve by conventional TBCs and almost all other IBCs, where the employed distortions make CAPTCHA tasks more difficult for humans. Therefore, according to various embodiments, it may be started with using web crawlers to mine 3D models from the web. As the crawlers return any sorts of model, the second part of the framework according to various embodiments may automatically filter out models which are simple enough to be distinguished by machine learning techniques, by analyzing model features. Now that all models have a baseline complexity, the third part of the framework according to various embodiments may order database objects based on relative size. This part may be a machine-human combination of the Merge Sort algorithm, which enables DeepCAPTCHA to use human object recognition ability, for example via the Amazon Turk service. There are considerable benefits of using Merge Sort including system time and budget constraints that will be discussed in more detail below. Having an ordered database of 3D objects, the fourth part of the framework according to various embodiments may be to automatically change original object appearances, using on-the-y translation, rotation, re-illuminated, re-coloring, and/or finally background cluttering, to camouflage objects from the "eyes" of machines. This part may reach a multiplication factor of over 1:200 (200 different images from a single 3D model). This large multiplication factor may protect DeepCAPTCHA against both exhaustive and machine-solver attacks (G3 & G6). Firstly, no 2D image is stored to be exhausted in the first place, and for each Ctask, a completely new appearance of objects may be created before presenting it to the users. Secondly, even if the database of objects are leaked, machines cannot link the newly generated images to the correct source object, and therefore fail to assign the correct size. The details of this object appearance alteration part of the framework will be described in more detail below, where the vital role of this part to make DeepCAPTCHA successful will be seen. Finally, with the freshly generated appearances, the fifth part of the framework according to various embodiments is to create a user-friendly CAPTCHA interface, compatible to all smart devices with large and small screens, while being robust against random attacks (G5).

In various experiments it may be shown that humans can solve Deep-CAPTCHA tasks according to various embodiments with relative ease (average accuracy of 83.7%), most likely due to their ability in object recognition and 3D generalization, while machines showing constant failure in either recognizing objects, or guessing the relative sizes.

Until now, none of commonly known IBCs may achieve all the goals of a reliable CAPTCHA (G1-G7). Main weaknesses of IBCs in the literature are high chance of random attack success (e.g. Gender CAPTCHA), high success rate of current machine algorithms (e.g. face detection CAPTCHA), and being prone to exhaustive attack (arguably all of previous IBCs).

According to various embodiments, the first practical IBC, DeepCAPTCHA may be provided, which satisfies all CAPTCHA design guidelines, based on human's ability in depth perception.

In the following, depth perception will be described.

Human's perception of the world relies on the information arriving at his/her sensory receptors, and the ability to transform and interpret sensory information (the ability to use what is known to interpret what is being seen). Processes of perception provide the extra layers of interpretation that enable humans to navigate successfully through the environment. This process assigns meaning to percepts (identification), and this identification involves higher level cognitive processes including theories, memories, values, beliefs, and attitudes concerning the objects.

Depth perception is a vital task in the human visual system that uses object identification, parallel lines, and textures as depth-related visual cues to create a 3D map of the surrounding environment. Our eyes only have two-dimensional retina images and no special third component for depth perception. This requires an interpretation of our physiological cues that leads to useful \perception" of the 3D world, by combining the retinal images of our two eyes. Humans use different visual cues including disparity and convergence (slight image differences in retina images, due to distance between pupils), motion parallax (when moving, different amount of object movement on the retina, determines their relative distances), pictorial cues (visual cues such as linear perspective and texture gradient), overlay (objects occluding each other are perceived in ordered depth), shadows (providing information about 3D form of objects as well as the position of the light source), relative size (objects of the same size but in varying distances cast different retinal image sizes), and known size (comparing current visual angle of an object projected onto the retina, with previous knowledge of the object size, can determine the absolute depth of a known object).

According to various embodiments, it may be focused on determining depth of known objects, using previous knowledge of their sizes. When two known objects are viewed together, humans can determine relative depth of the two objects based on perceived object sizes. For example if a chair and a car are perceived with the same size, then the chair is perceived much closer than the car as the prior information dictates that a car is much larger than a chair. According to various embodiments, in CAPTCHA, the same principle may be used to create a task (Ctask): 2D images of different objects may be shown, such that they appear almost the same size, and the user may be asked to order them these objects terms of size. This task is only possible if the normal sizes of these objects are known, in other words, only if these objects are identified. While humans can perform this task with relative ease (due to their prior knowledge of the objects), it is still a significantly difficult task for machine algorithms to perform.

Automatic object recognition is a well-known field in computer vision, with a wide range of algorithms proposed for different object recognition scenarios, that can be categorized into color-based and shape-based methods. While some methods mainly used color-signatures of the objects to recognize their images, other works mainly used shape features of the objects for recognition, and finally some other methods used a fusion of both color and shape features. Based on these approaches, to prevent a machine from recognizing an object, according to various embodiments, both its color and shape signatures may be hidden to such an extent that machines fail to learn and recognize the objects, but also not to the extent that human users fail to recognize the (new appearances of the) object.

In the following, a framework to automatically choose 3D models of objects, determine their relative sizes, hide their original, signatures, and then present it to the end users to be sorted according to various embodiments will be described. Furthermore, the level of appearance alteration to avoid machines from recognizing objects, while keeping the Ctask easy enough for humans, will be described. In the following, a system design and framework according to various embodiments will be described.

According to various embodiments, a CAPTCHA based on depth perception may be provided, which has full control on object manipulation, and for which 3D models of objects are used as a major portion of the framework. Among different representations of 3D models, it may be worked with VRML format as it is an XML-based 3D object modeling language that is easy to read and manipulate and is also light-weight and supported by a wide range of software, such as web-browsers, standalone renderers, and smart-phone applications. Moreover, almost all of the well-established 3D modeling formats (e.g. 3D Studio Max, Maya, and Sketchup) can be easily converted to VRML format using small open source/freeware applications.

Based on this VRML core, the design of a fully-automated framework according to various embodiments to mine 3D models from the web and use them to create Ctasks may be provided. Each Ctasks includes (or is) a plurality of images (for example a grid of 6 images) of different objects, and user's task is to order these images in terms of their relative size (i.e. the size of the object each image represent). In order to automatically create these Ctasks, the framework according to various embodiments may include five parts, namely, object mining, object filtering, object ordering, appearance altering, and finally presenting the Ctask to the user (user interface).

Figure 3:
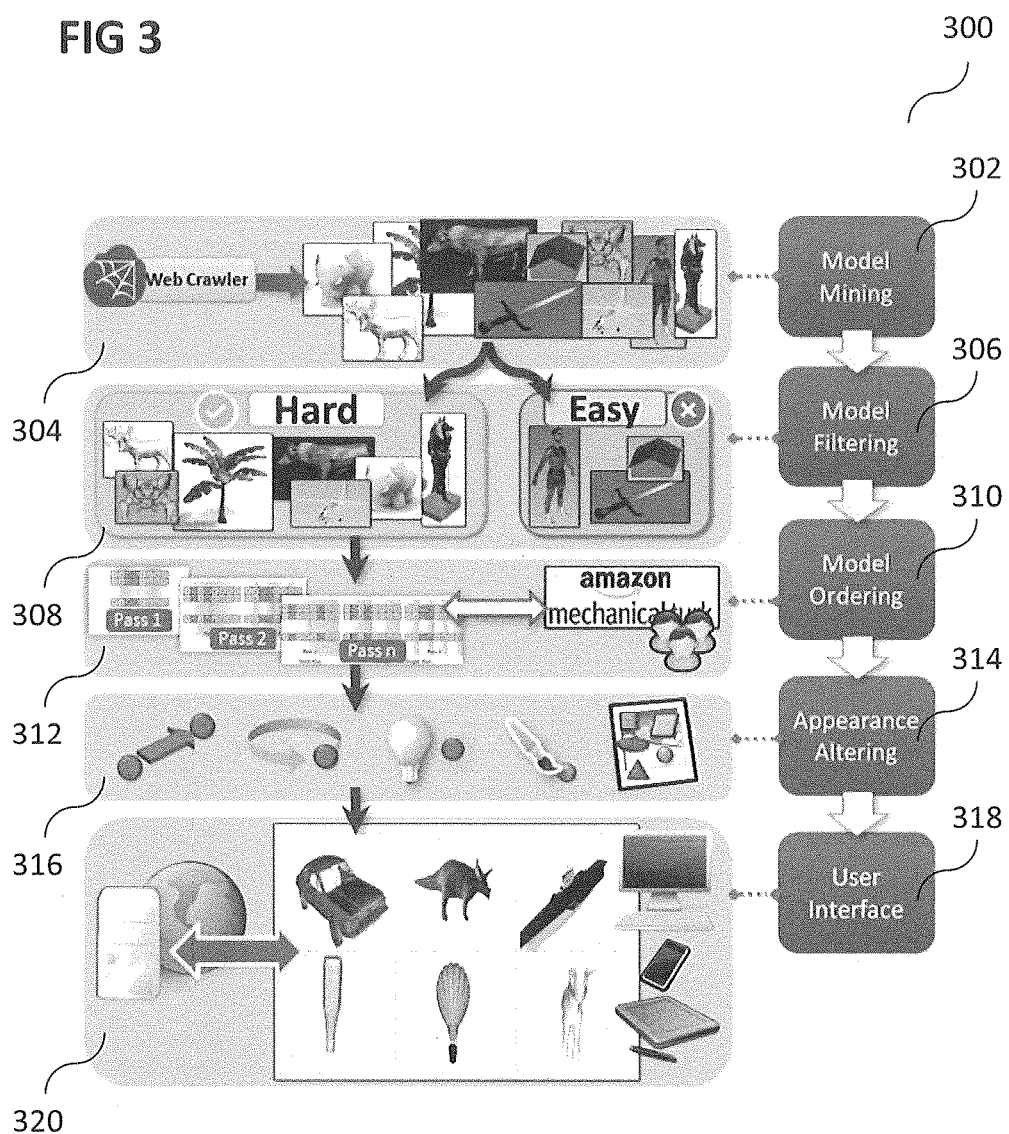
FIG. 3 shows an illustration of the DeepCAPTCHA framework according to various embodiments.

FIG. 3 shows an illustration 300 of the DeepCAPTCHA framework according to various embodiments and an abstract flow diagram of a verification method according to various embodiments. For example model mining 302 may be provided, like illustrated in 304. Model filtering 306 may be provided, like illustrated in 308. Model ordering 310 may be provided, like illustrated in 312. Appearance filtering 314 may be provided, like illustrated in 316. A user interface 318 may be provided, like illustrated in 320.

Each of the five components of the framework according to various embodiments is provided with a goal-specific design that make the entire the framework easy to implement and use, while making the resulting Ctaks robust against attacks (automatic solvers, random attacks, as well as exhaustive attacks). Therefore, the framework according to various embodiments is not only the first framework for an image-based CAPTCHA (IBC) that satisfies all CAPTCHA design guidelines, but also a framework that may be easily scaled and evolved alongside the advances in computer vision field.

In the following, the details of each component and the contribution in each of these components will be described, followed by a discussion on the framework scaling and evolving ability.

In the following, object mining according to various embodiments will be described.

For a CAPTCHA to work on 3D models, according to various embodiment, the very first step may be to create a database of models, which can be automatically obtained, maintained, and refreshed. Thus the first part of the framework according to various embodiments may be the object mining part, in which free 3D models from the web may be found using web crawlers. There are many publicly available crawlers among which several free 3D model datasets for 3D models in formats of VRML, 3D Studio Max (.3ds and .max), Maya (.ms), Sketchup (.skp), etc. (as all of these models can be easily converted to VRML 2.0), may be mined, for example using a free FireFox crawler plug-in, FoxySpider. For example, 1000 (one thousand) 3D models may be gathered within minutes including models of people, furniture, plants, animals, insects, and other man-made objects. Each model may be anonymized by changing its file name to a generic name and removing all the included descriptive information such as tags and object descriptions.

In the following, object filtering according to various embodiments will be described.

Using web crawlers, a diverse range of 3D models with different quality, complexity, color, texture, etc. may be received. If a model is too simple or its appearance cannot be changed significantly (e.g. a sphere), machine learning techniques can be used to learn its appearance and break the CAPTCHA. Therefore, according to various embodiments, "easy" (for machine) models may be automatically filtered out and only "hard" models may be used in the CAPTCHA. The second part of the DeepCAPTCHA may perform a rough classification on each new model to determine its difficulty for machines to learn the object's signature.

According to various embodiments, no (number) of parts, no (number) of points, no (number) of joints, SIFT (scale invariant feature transform) features, roughness, and curvature of the four major views (front, right, left, back) may be used (for example for filtering). To gather the training data, classification accuracies of several well-known classifiers (linear, radial-basis, and polynomial SVM (support vector machine), randomforest, and K-NN) on images of 100 objects may be gathered. For each object, there may be 24 views, each view showing the object in a random color. According to various embodiments, 14 views may be used for training and 10 for testing for each of the classifiers.

Figure 4:
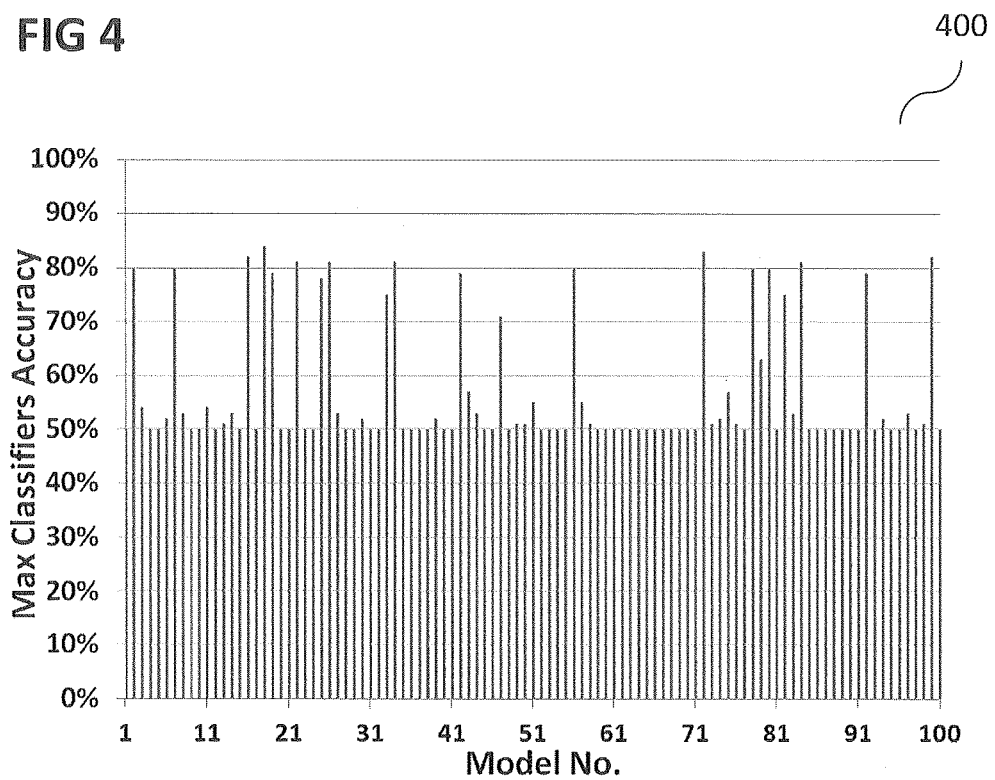
FIG. 4 shows an illustration of the maximum accuracy of various classifiers.

FIG. 4 shows an illustration 400 of the maximum accuracy of these classifiers based on the aforementioned features. As this figure shows, classification for the majority of models is at the random rate, however, some of the models create spikes in this trend as they are easy-to-learn models based on their visual appearances. FIG. 4 illustrates Filtering "easy" models based on rough classification accuracies on modelfeatures.

The objective of the second part of the DeepCAPTCHA framework according to various embodiments is to remove these "easy" models from the dataset. Therefore, model features may be used, labeled with the related maximum classification accuracy, to train a new SVM classifier to label each new model as easy or hard.

Now that all database models have a baseline complexity, it may be desired to know their relative size to create a DeepCAPTCHA Ctask, which is the next part of the framework according to various embodiments.

In the following, object ordering according to various embodiments will be described.

According to various embodiments, in a DeepCAPTCHA task, several (for example 6) objects to be sorted in terms of size by the user may be presented, and as these objects are automatically mined from the web, there may be no intuition about their real-world sizes. Therefore, it may be desired to first know the relative size between the objects, in order to know whether a CAPTCHA task (Ctasks) is solved correctly. The purpose of the third part in the DeepCAPTCHA framework according to various embodiments is to use a human-machine sorting algorithm (for example a modified Merge Sort) to continuously order the database of objects, as the stream of new object is continuously refreshing the database.

There are several possible approaches in object size assignment, for example, using absolute size categories, and using relative size relationships. In the absolute size scenario, humans assign a categorical size (e.g. very small, small, normal, big, very big, etc.) to each object. This scenario may have the advantage that it requires only n comparisons, (wherein n is the number of objects in the database). On the other hand, using categorical size restricts object sizes to a limited set, which in turn restricts the possible set answers to the final Ctask, thus reducing the robustness of the CAPTCHA against random attacks. Moreover, with a limited set of size categories, there is a high possibility that different users assign different sizes to the same object. In contrast, using relative size relationships increases the space of possible answers to the Ctask, and also addresses the ambiguity problem of assigning different sizes to the same object, but requiring a larger number of comparisons ($O(n \log n)$).

According to various embodiments, the relative size approach may be chosen as it produces a stronger Ctask. To store object relations, a directed graph of linked-lists data structure G=(V;E) may be used. Each vertex v may be a linked-list storing objects with similar sizes, and each edge e may represent the relation "larger than" to another set of objects.

A challenge for automatically sorting the object database may be that machine-learning approaches fail to perform object recognition (a desirable feature for CAPTCHA). According to various embodiments, a modified Merge Sort algorithm that uses Amazon Mechanical Turk (AMT) service (actual humans) may be used to compare objects and add them to the belonging vertices in G. Merge Sort treats the database as an unsorted list of objects, and as it progresses in this list, whenever a comparison between two objects $x_i$ and $x_j$ ($x_i$, $x_j \notin V$ or ($x_i$, $x_j) \notin E$) is required, and their images are sent to the AMT service for a relative size comparison. After a certain number of AMT responses, the median of the answers are set to the database.

In occasions, scale thresholds may not be sharp, so the selection of 3D models needs to account for this potential confusion by discarding objects that may be perceived as belonging to more than one size category. Other foreseeable challenges include the likely familiarity of the target user with object category and instance (groups of users may not be familiar with some car categories or models, unconventional chair models or uncommon animals), as well as closeness to a set of canonical projections of objects, as further explained below. To avoid models with ambiguity (e.g. car model that also appears like a toy), objects that more than l (here l=3) AMT users assign different relations to them may be discarded.

In the following, a partially sorted database will be described.

According to various embodiments, the relative size scenario that requires more object comparisons and therefore costs more than absolute size scenario (choosing stronger CAPTCHA, over fewer number of comparisons) may be chosen. For a complete ordered set, there may be a need of n log(n) comparisons in the worst case, and as the comparisons may be outsourced, the number of comparisons becomes a very important issue of the system design for DeepCAPTCHA. This may be because the system is charged for each comparison by AMT, and also the comparison by humans becomes the running time bottleneck of the entire system. There are two possible approaches in size assignment, namely, using absolute size categories, and using relative size relationships.

A first approach may be to use partially-sorted database to create Ctask. Considering the database of the objects as the list L to be sorted, disjointed (in other words: disjoint or disjunct) sub-lists $l_1, l_2, \ldots, l_k \subset L$, may be sorted up to a state that the final Ctask meets the required robustness against random attacks (having large enough answer space), while consuming the minimum resources. The size of these sorted sub-lists can be increased when the system constraints are relaxed. The main idea behind using partially sorted dataset is that it may be necessary to only know the relation between a small number of objects for each Ctask, therefore given a large number of disjointed small sorted sub-lists with len($l_i$)<<len(L), that are just long enough to create a Ctask, we can avoid a considerable number of comparisons.

Using Merge Sort may bring forth two advantages in implementing the partially-sorted database approach. First, during the sorting process in the Merge Sort, at each point one can know the number of disjointed sorted sub-lists, as well as their lengths. Second, Merge Sort can be directly used for parallel sorting, which matches the nature of AMT service, significantly reduces the required running time, and creates individual sorted sub-lists in the process.

In the following, the reCAPTCHA concept according to various embodiments will be described.

According to various embodiments, a second approach to reduce the number of required comparisons may be to use the reCAPTCHA concept in Deep-CAPTCHA. The reCAPTCHA project helps to digitize books, by sending words that cannot be read by computers (OCR) to the Web in the form of CAPTCHA for humans to decipher. Each CAPTCHA task is consisted of two words, one known to the system, and one unknown to coming from OCR. After more than a certain number of users enter the same answer for the unknown word, the system registers the value as the correct answer. Similarly in DeepCAPTCHA, there may be partially ordered dataset and therefore in each Ctask, c−1 objects $(x_1, \ldots x_{c-1})$ may be selected from the ordered list and an object $x_0$ from the unordered list. Then if more than a certain number of users select the same order for object $x_0$, this order may be added as the relation of x' to $\{x_1, \ldots x_{c-1}\}$ to the database. Using this approach, the set of database relationships may be gradually increased without outsourcing them to the AMT service.

In the following, the appearance alteration according to various embodiments will be described.

Regardless of the number of objects in the database, the entire database may be exhausted using services, if these objects are used in their original appearances (similar to previous IBCs e.g. CAPTCHA The Dog). The fourth part of the framework according to various embodiments may be to alter object appearances before presenting them as Ctasks. According to various embodiments, 3D translation, 3D rotation, re-illumination, re-coloring, and background cluttering may be used to hide the object signature from the "eyes" of machines.

In the following, translation and rotation according to various embodiments will be described. For each of the selected objects, translation and rotation may be used to change the viewpoint of the object. Object rotation in 3D may significantly change the object appearance in the final 2D image. The center of rotation may be the center of object bounding box. For each subject, the object may be rotated between 20 to 340 degrees. This is because experiments may show a minimum of 20 degrees change of view to reduce performance of machine learning algorithms close to random.

Figure 5:
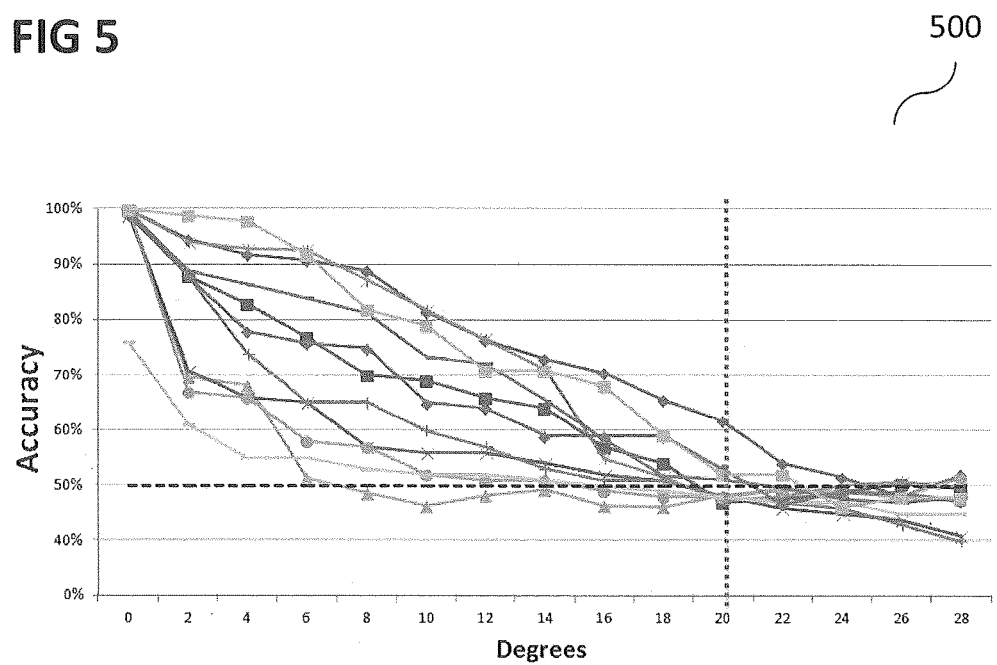
FIG. 5 shows an illustration of machine-learning performances.

FIG. 5 shows an illustration 500 of machine-learning performances as the viewpoint difference increases, for 10 sample objects. As shown in the machine performances for recognizing 10 sample objects as the viewpoint difference increases in FIG. 5, it seems that 20 degrees viewpoint change is an optimal choice.

For this experiment, commonly used features were fed in object detection, including: RGB histogram, opponent color histogram, Hue-Saturation histogram, transformed color histogram, color moments, SIFT (Scale-Invariant Feature Transform), color invariant SIFT, HueSIFT, HSVSIFT (hue saturation value SIFT), opponent SIFT, RG SIFT (SIFT descriptors are obtained from the red/green color space), RGB (red green blue) SIFT, and SURF (Speeded Up Robust Features).

In addition to general object rotation, in cases that VRML (Virtual Reality Modeling Language) joints are defined for the object (e.g. human body joints) the joint angle may be randomized in the permitted range to increase the appearance variation.

In the following, re-illumination according to various embodiments will be described. After translation and rotation, the selected object may be re-illuminated, for example using (for example 12) VRML point-lights, for example around the bounding box of the object, 4 round the front, 4 around the middle, and 4 around the back of the object, with 3 object-width away from the center of front, middle, or back. In each alteration, we randomly turn on 3 to 6 lights.

In the following, re-coloring according to various embodiments will be described. Given an object with p parts, p samples from the HSV space may be drawn using uniform probability, in order to hide the color signature of the object. The HSV color space may be used in several color-based object recognition approaches, thus, randomizing the object color signature in this space helps confusing these machine algorithms. In addition for each object part to be re-colored, a new color may be assigned with a probability of 50%, or the color of the previous part in the object may be assigned. This uncertainty in assigning new color, or using a previously used color may prevent algorithms to identify/count object parts from their color.

In the following, background cluttering according to various embodiments will be described. Cluttered background may be one of the commonly used methods to fool object detection algorithms in text- and image-CAPTCHA. Like these CAPTCHA, according to various embodiments, background cluttering may be used to increase the difficulty for machines, but unlike previous CAPTCHA, according to various embodiments the background may be cluttered with the very same features for which machines are searching. Fraction of random object parts (for example randomly generated object sections from VRML codes from the database) may be used, and thus several other objects' feature signatures may be added into the CAPTCHA image. As a result of each CAPTCHA image containing signatures of several objects other than the main object, the difficulty of automatic object recognition dramatically increases. On the other hand, humans may easily differentiate the fully represented object from the cluttered background of object parts. To further aid this differentiation, the transparency of the background may be reduced, for example by 20%. This effect may attract human attention to the main object due to its higher contrast.

The final image representing the selected object may be resized so that all (for example six) selected objects appear (at least substantially, in other words: almost) the same size in the final CAPTCHA presentation. The images may be resized so that lengths of objects along their major axis are the same. The major axis in each image may be found by fitting a line on the 2D location of pixels belonging to the object in the 2D image. Using 3D model, the pixels belonging to the object may be found by using the alpha/depth channel of the VRML renderer. An Example of the final altered image is illustrated in FIG. 6.

Figure 6:
FIG. 6 shows an illustration of an example 3D model (top), and its final altered image.

FIG. 6 shows an illustration 600 of an example 3D (three-dimensional) model (top), and its final altered image (bottom) created on the fly, to be sent for Ctask.

The result of the appearance alteration part may be a multiplication factor of over 1:200, i.e. 200 different images may be created from each 3D model in the database, on-the-fly. This multiplication factor, comparable to the text-CAPTCHAs, is never achieved by previously proposed IBCs, and plays a significant role in protection against exhaustive and machinesolver attacks.

In order to test the effectiveness of appearance alteration, two sets of experiments may be performed. It is to be noted that for an algorithm to solve DeepCAPTCHA, it has to either identify the objects and then use a prior information to determine the size of the objects (e.g. first identify a bee and a car, and based on a prior information of relative size of cars and insects, solve the CAPTCHA), or directly estimate the relative size of the presented objects (e.g. into generic size categories). Therefore, machine performances may be tested in both of these scenarios. Using 100 objects as the dataset, 20 images may be created per object based on the above appearance alterations. Then several well-known classifiers (linear, radial-basis, and polynomial SVM, random-forest, and K-NN) using randomly selected %60 of the images may be trained, based on the aforementioned 14 features (RGB histogram, opponent color histogram, SIFT, SURF, etc.) and then tested their performances on the remaining %40. Experimental results according to various embodiments show that due to the introduced variations, in object appearances, machines constantly fail in both object recognition and object size estimation.

Figure 7A:
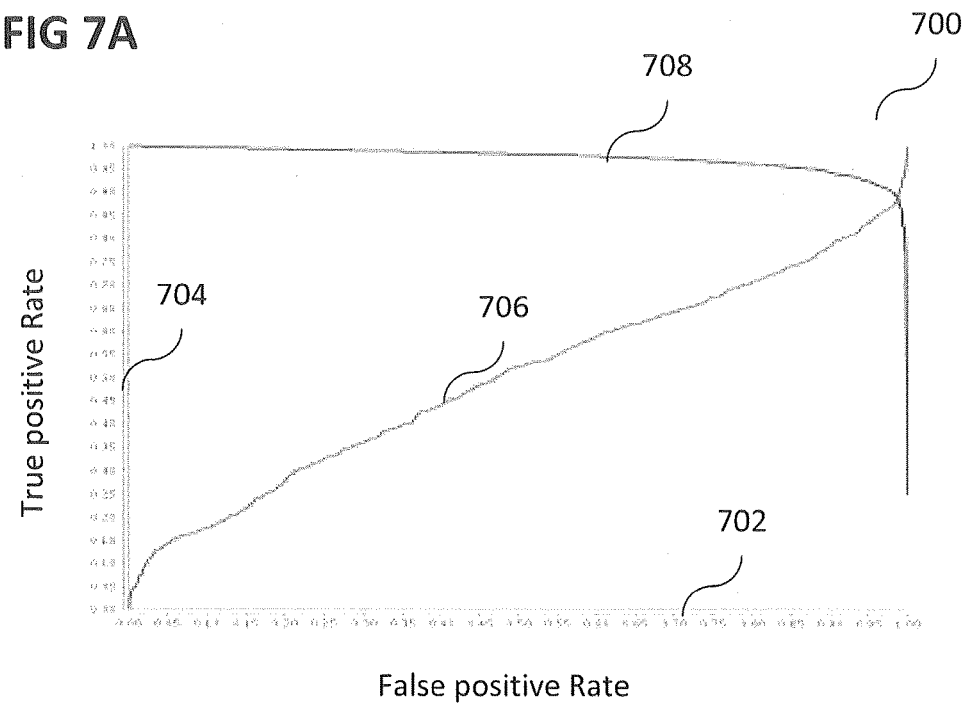
FIG. 7A and FIG. 7B show illustrations of machines random behavior in assigning size categories and object recognition.
Figure 7B:
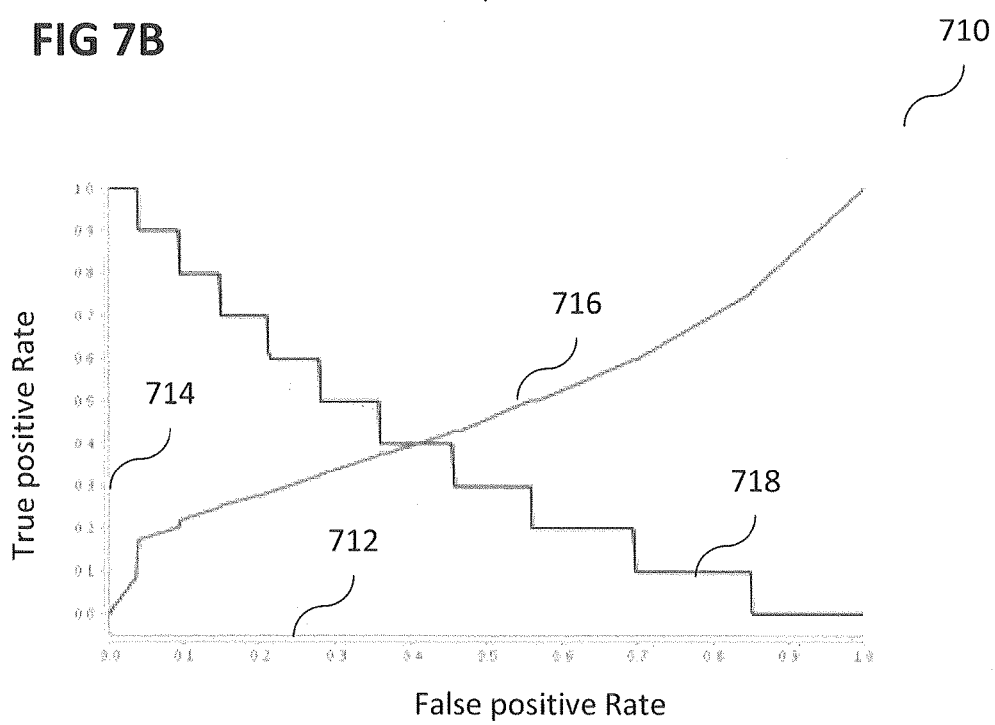

FIG. 7A and FIG. 7B show illustrations of machines random behavior in assigning size categories and object recognition.

In FIG. 7A, a plot 700 is shown with a horizontal axes 702 indicating a false positive rate and a vertical axes 704 indicating a true positive rate. An ROC (or RoC, which may stand for receiver operating characteristic) curve 706 of machine performance on classifying objects into size categories. Line 708 indicates the applied threshold. The RoC curve 706 suggests poor classification performance.

In FIG. 7B, a plot 710 is shown with a horizontal axes 712 indicating a false positive rate and a vertical axes 714 indicating a true positive rate. An ROC curve 716 of machine performance on recognizing objects. Line 718 indicates the applied threshold. The RoC curve 716 suggests poor classification performance.

In the following, presentation according to various embodiments will be described. The final part of the DeepCAPTCHA framework according to various embodiments is the presentation on the user's device. This part may provide an intuitive user interface, that is both easy to understand and use for humans, and robust to random attacks. As most of the internet users migrate to use mobile devices, this interface may be compatible to various devices and screen sizes.

According to various embodiments, a simple, lightweight user interface, for example consisting of a grid 3×2 images to be sorted by the user may be used. The user may select images in the order of size by clicking (or tapping) on them. As the user selects images, his/her selection appears as image thumbnails above the 3×2 grid, and the user may reset the current selection by clicking (or tapping) on these thumbnails. Finally there may be a submit button to be hit when a confident order is reached and a refresh button for the cases that the user cannot solve the Ctask for any reason.

In each request for Ctask, up to one "equal" relation between the presented objects (i.e. not more than two objects are equal in size) may be allowed. In addition, to avoid any ambiguity in size, the objects with no "equal" relation may be restricted to have at least 2 levels of distance from each other (i.e. objects with minimum distance of d=2 in the database graph G).

Random attack success probability in this presentation is $$\frac{1}{6!} = 1.3889 \times 10^{-3}$$

for cases with none of the objects have equal sizes, and $$\frac{2}{6!} = 2.7778 \times 10^{-3}$$

for cases with two objects having the same size. This probability for the success of random attacks falls well in a commonly acknowledged safe range.

It is to be noted that in case of using partially sorted database, the random attack success probability would be higher than above. This is because the space of possible answers reduces, due to reduction of the total number of usable objects (sorted lists of objects). Given a sorted dataset of n objects, and c objects in each Ctask, the probability of a successful random attack is $$\frac{1}{_nC_c \times c!} = \frac{c!(n-c)!}{n!c!} = \frac{1}{_nP_c} = \frac{(n-c)!}{n!}$$

If the sorting stops just before the final merge (reducing n/2 comparisons), the success probability increases to $$\frac{(n/2-c)!}{n/2!}.$$

However, this reduction does not threat the final robustness of the Ctask against random attacks. For example, in a dataset of 1000 objects (realistic databases may have more than 100000 objects) with each Ctask requiring 6 objects, stopping at sub-lists with lengths of n/2 and n/4, increase success probability of random attack from 1/994,010,994,000 to 1/61,752,747,000 and 1/3,813,186,000 respectively, which may not have any significant effect on the robustness of Ctasks.

In the following, realization and human tests according to various embodiments will be described.

For actual realization of the interface, developed a web service may be provided that when called, sends a Ctask from a Deep-CAPTCHA web server. Using. JavaScript+ HTML5 enabled to efficiently display DeepCAPTCHA on both conventional and mobile devices, and moreover makes it possible to adapt to mobile device capabilities such as orientation change to re-order the interface for the current orientation, or shake action by the user as the refresh action.

An experiment may be conducted to observe actual human users performance and their preference between DeepCAPTCHA and conventional text CAPTCHA. After collecting the user information (gender, age, education level, etc.), the users should complete 7 DeepCAPTCHA tasks, and 3 text CAPTCHA tasks (from Google's text CAPTCHA web service). In order to assess the increase of difficulty for human users by adding appearance alterations, the 7 Deep-CAPTCHA tasks may be divided into 3 sets. The very first DeepCAPTCHA task is consisted of only original objects (without appearance alteration); the next 3 tasks are consisted of objects with color and lighting variations, and finally the last 3 Deep-CAPTCHA tasks are consisted of full appearance alteration including re-coloring, re-illumination, and background addition.

A total of 66 users participated in our experiment, using PCs, tablets, or smart phones, with average age of 28.5 years, 69% male and 31% female, and with education level from high-school students to PhD students. These users connected to our web service from several countries around the world including US, Canada, Australia, Singapore, and China, solving 311 DeepCAPTCHA tasks and more than 115 text CAPTCHA tasks.

Figure 8:
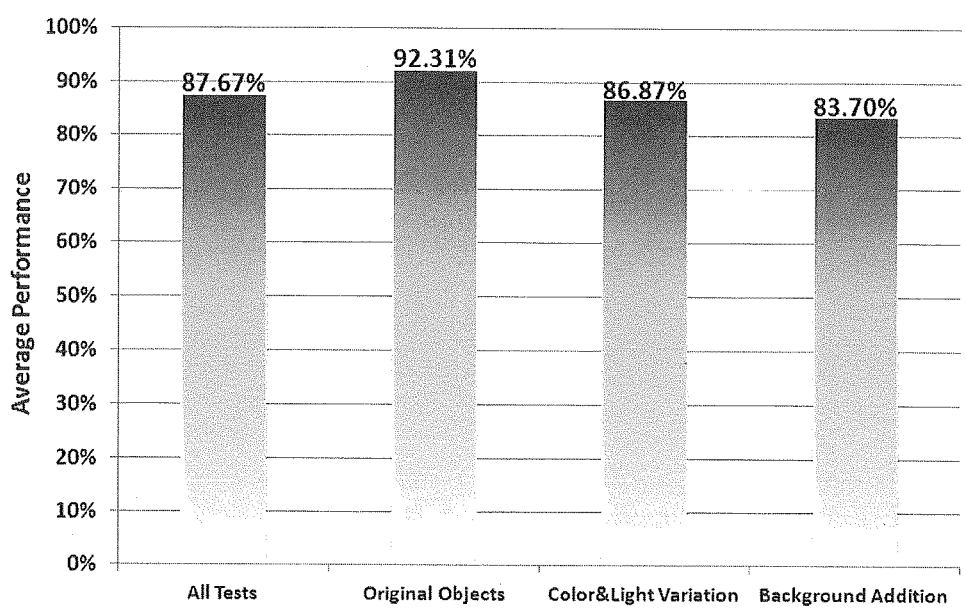
FIG. 8 shows an illustration of the average of human performances in an experiment according to various embodiments.

FIG. 8 shows an illustration 800 of the average of human performances in an experiment according to various embodiments (for example illustrating average human performances on Ctasks with different distortion levels), with 87.7% in total of the experiment (including all three types of DeepCAPTCHA tasks). The decrease in average performance may be observed as the appearance alteration level increases (from 92.31% to 86.87% and 83.7%), however, even with addition of backgrounds, the performance level is higher than a commonly acknowledged acceptable range.

According to various embodiments, a usability test may also be performed in which 86.84% preferred DeepCAPTCHA over text CAPTCHA, and depicting a much higher ease of use for DeepCAPTCHA than text CAPTCHA, shown in Table 1.

TABLE 1

Average user preferences and easy-of-use.

|  | Prefered | Ease-of-Use |
| --- | --- | --- |
| DeepCAPTCHA | 86.85% | 3.20/5 |
| Text CAPTCHA | 13.16% | 0.87/5 |

Results of this usability test indicates that given a reliable service, users are likely to migrate from using TBCs to using DeepCAPTCHA (particularly due to the ease-of-use). Moreover, their high preference for DeepCAPTCHA can also indicate users' trust in security of DeepCAPTCHA. These two points motivate us to advance our IBC to the next level, beta-version, based on a realistically large database and reliable webservers.

In the following, DeepCAPTCHA security according to various embodiments will be described. The CAPTCHA literature defines a different level of security as the "accepted level", than in other fields. It is to be noted that unlike fields such as biometrics that try to provide absolute guarantees for the system security, the accepted level of security for a CAPTCHA is to make the Ctasks hard enough that the cheapest way to break a CAPTCHA would be paying humans to solve it. In other words, a CAPTCHA therefore is successful, essentially, if it forces an automated attack to cost more than 30 seconds worth of a human's time in a part of the world where labor is cheap. In the following, possible attacking methods for the DeepCAPTCHA tasks according to various embodiments will be described.

In the following, brute force will be described. In the brute force method, the attacker submits random solutions to each Ctask, hoping that one would succeed by chance. Brute force attack success probability with no basis for a decision (i.e. 50% probability of choosing the order for each image) in an exemplary presentation of 3×2 image girds is $$\frac{1}{6!} = 1.3889 \times 10^{-3}$$

for cases with none of the objects have equal sizes, and $$\frac{2}{6!} = 2.778 \times 10^{-3}$$

for cases with two objects having the same size. This probability for the success of random attacks falls well in the commonly acknowledged safe range.

In addition, it may also be possible to restrict the number of failed trials from a single IP address, and therefore decrease the success probability of brute force attacks. For example, a token bucket scheme may be used that penalizes IP addresses that get many successive wrong answers by forcing them to answer two challenges correctly within 3 attempts before gaining a ticket. With this scheme in place, attackers may expect only one service ticket per 5.6 million guesses.

In the following, machine vision attacks will be described. While brute force attack resides on almost no prior knowledge Ctasks, the attacker may use machine vision techniques to gain some form of prior knowledge to bias the probability towards the Ctask solution. For our DeepCAPTCHA however, not only the presentation prevents brute force attacks, but also object filtering and appearance alterations prevent attacks based on image processing techniques. As described above, according to various embodiments, several distortions may be applied to each image including translation and rotation, re-illumination, recoloring, and re-illumination. In our experiments we showed that these appearance alterations prevent machines to recognize either individual objects or their size category, while keep the human performance sufficiently high. In these experiments, well-known image features may be used such as SIFT, SURF, and color histograms, to show that given alteration by a minimum degree (e.g. 20 degrees in rotation) machines performance can be kept at a chance level, and therefore at the same level of brute force attacks, discussed above. FIG. 4, FIG. 5, and FIG. 7 illustrate results of the experiments.

It is to be noted that the failed attempt restriction on IP addresses also may help the CAPTCHA according to various embodiments to prevent the attacks based on machine vision. Given that it is likely for machine performance to improve slightly above chance in the near future, this restriction prevents machines to break DeepCAPTCHA by combining machine vision and brute force attacks.

In the following, exhaustive attacks will be described. Each time a Ctask is presented, a part of the CAPTCHA image space is revealed to the end user, and regardless of the size of this image space, given a finite time, all of this space would be revealed (with the assumption of slower growth rate than the presentation rate). In the exhaustive attack, the attacker exhaustively download and solve all the images in the database, so that from a point forth, almost any new Ctask would be consisted of pre-solved images. The exhaustive attacks are usually conducted by hiring cheap human labor (e.g. Amazon Mechanical Turk) to exhaust the CAPTCHA database. This attack is the greatest defect in many previous image-based CAPTCHAs, such as Google's CAPTCHA, Avatar CHAPTCHA, and Confident CAPTCHA. Particularly, Asirra has become a classical example of this attack, which even with more than 3 million images in their database, fell victim to the exhaustive attack.

While exhaustive attack seems inevitable, a CAPTCHA can prevent this attack by increasing the human pre-solver cost, just enough to exceed the cost of hiring a constant human solver for the CAPTCHA. In other words, the goal is to make the most efficient attack on a new Ctask, paying people to solve that Ctask. This is usually achieved by increasing the size of the database by applying image distortions (in both text and image based CAPTCHAs). In Deep-CAPTCHA, appearance alteration section expands the original database of 3D objects by 3 orders of magnitude. This not only dramatically increase the CAPTCHA image space, but also keeps the DeepCAPTCHA safe even if the original database of objects is attacked. The latter is because the appearance alteration is performed on-the-y for each image, and we showed that machine vision techniques cannot find the correspondence between the original 3D object, and the altered image. In other words, even if our original database of 3D objects are made public, the attacker cannot use current image matching techniques to relate image in a Ctask, to objects in the publicized database, and therefore cannot use exhaustive attack to break DeepCAPTCHA.

An additional issue regarding the security of the CAPTCHA according to various embodiments against exhaustive attack is when partial sorted databases are used. This is because in case of using a partially sorted database, the CAPTCHA image space would be reduces, due to reduction of the total number of usable original objects. Given a sorted dataset of n objects, and c images in each Ctask, the number of possible combinations of usable 3D objects is:

$$_nC_c = \frac{n!}{c!(n-c)!}$$

The formula $$_nC_c = \frac{n!}{c!(n-c)!}$$

as described herein may compute the number of possible distinct presentation given n database objects and a CAPTCHA task of displaying c objects each time. This may quantify the effort to reveal the whole database.

If the sorting stops just before the final merge (reducing n/2 comparisons), the number of possible images decreases to $$\frac{\left(\frac{n}{2}\right)!}{c!\left(\frac{n}{2}-c\right)!}.$$

However, this reduction does not threat the final robustness of the Ctask against brute force attacks. For example, in a dataset of 1000 objects (realistic databases may easily have more than 100000 objects) with, each Ctask requiring 6 objects, stopping at sub-lists with lengths of $$\frac{n}{2} \text{ and } \frac{n}{4},$$

decreases the number of possible images from 1,380,570,825 to 85,767,704 and 5,296,091 respectively, which don't have any significant effect on the robustness of single Ctasks, while reducing a significant number of comparisons (and therefore cost). However it should be noted that due to this gradual revealing of the database, there is vital need for the original database of objects to be refreshed and grow.

Finally, it should be again noted that the use of failed attempt restriction on IP addresses generally helps preventing exhaustive attacks.

Text-based CAPTCHAs (TBCs) have been used over a decade now with its limitations and image-based CAPTCHAs (IBCs) have risen to address the problems in TBCs. However, IBCs face challenges that does not threat text-based CAPTCHAs including computer vision solver algorithms and exhaustive attackers.

According to various embodiments, DeepCAPTCHA may be provided, an IBC build on CAPTCHA design guidelines, humans ability of depth perception, and empirical experiments, that the first practical IBC that satisfy all CAPTCHA design guidelines. Deep-CAPTCHA exploits 3D models, human-machine sorting, and appearance alteration distortions to confuse machines, while keeping the task easy for humans. Experiments show a high performance and satisfaction from human users, and constant failure from conventional machine algorithms.

DeepCAPTCHA according to various embodiments may also stimulate interesting research in computer vision field, as this type of IBCs that draw experience from interacting with the physical environment, through an evolutionary process. We can therefore envision a robot that learns to differentiate objects by size as a result of observing and interacting with everyday objects over extended time periods.

According to various embodiments, the shapes may be visualized in a high-resolution brail device for the visually impaired users.

Based on the approaches according to various embodiments for cost reduction, a constantly evolving database may be provided for IBC. According to various embodiments, the object mining strategy may be extended to: a) target specific types or scales of models in available 3D model databases such as Google Warehouse, Archive 3D, and the rapidly evolving repositories for 3D printing files; b) connect with engineering, design and art programs where students continuously produce original 3D models. Using an ever-growing collection of 3D models, our approach can be closer to TBCs in terms of the pool of original content. Using this constant stream of new 3D models, we can even be closer to the TBCs in terms of the pool of original content.

According to various embodiments, the following may be provided:
An image-based CAPTCHA (IBC) based on humans high-level cognitive processes of depth perception;
The first IBC to satisfy all seven CAPTCHA design guidelines;
A fully automatic framework that collects, maintains, and refreshes its CAPTCHA materials (3D objects);
An automatic method to label unknown materials in the database, using a human-machine combination in Merge Sort; and/or
Techniques in each part of the framework to create a practical IBC.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A verification method comprising:
   determining a plurality of objects, each object having a property;
   displaying a representation of each object of the plurality of objects;
   receiving from a user an input indicating a sequence of the plurality of objects;
   determining a sequence of the properties of the plurality of objects; and
   comparing the input with the sequence of the properties of the objects;
   wherein displaying a representation of each object of the plurality of objects comprises changing an appearance of the representation of the object and displaying the representation of the object with the changed appearance; and
   wherein changing the appearance comprises three-dimensionally rotating the representation of the object.

2. The verification method of claim 1,
   wherein the property of each object of the plurality of objects comprises a quantifiable value.

3. The verification method of claim 2,
   wherein determining the sequence of the properties of the plurality of objects comprises ordering the properties in ascending order according to the quantifiable values of the plurality of objects.

4. The verification method of claim 2,
   wherein determining the sequence of the properties of the plurality of objects comprises ordering the properties in descending order according to the quantifiable values of the plurality of objects.

5. The verification method of claim 1,
   wherein comparing the input with the sequence of the properties of the objects comprises determining whether the input indicates a sequence of the plurality of objects which matches with the determined sequence of the properties of the plurality of objects.

6. The verification method of claim 1,
   wherein the representation of at least one object of the plurality of objects comprises at least one of a visualization of a model of the object, a visualization of a two-dimensional model of the object, a visualization of a three-dimensional model of the object, a drawing illustrating the object, a photo showing the object and a video showing the object.

7. The verification method of claim 1,
   wherein the property of at least one object of the plurality of objects comprises a property which can be determined based on experience in real world without special training.

8. The verification method of claim 1,
   wherein the property of each object of the plurality of objects comprises at least one of a size of the object, a speed of the object, an age of the object, a maximum travel distance of the object, a maximum flight height of the object, a temperature of the object, a geographical location of the object, a latitude of the object, a longitude of the object, an altitude of the object, a mass of the object, a price of the object, a power of the object, a computing power of the object, a brightness of the object, a popularity of the object, a wind resistance of the object and a flexibility of the object.

9. The verification method of claim 1,
wherein the object comprises a person, an animal, a microorganism, a virus, an article, a building, a place, a city, a vehicle, a motorized vehicle, a car, a truck, a computer and a mobile phone.

10. The verification method of claim 1,
wherein changing the appearance further comprises at least one of translating the representation of the object, scaling the representation of the object, changing an illumination of the representation of each object, changing a coloring of the representation of the object and changing a background of the representation of the object.

11. The verification method of claim 10,
wherein changing the background of the representation of the object comprises cluttering the background.

12. The verification method of claim 1,
wherein the verification method comprises a CAPTCHA.

13. A verification device comprising:
an object determination circuit configured to determine a plurality of objects, each object having a property;
a display circuit configured to display a representation of each object of the plurality of objects;
an input circuit configured to receive from a user an input indicating a sequence of the plurality of objects;
a property sequence determination circuit configured to determine a sequence of the properties of the plurality of objects; and
a comparing circuit configured to compare the input with the sequence of the properties of the objects;
wherein the display circuit is configured to change an appearance of the representation of the object and to display the representation of the object with the changed appearance; and
wherein the display circuit is configured to change the appearance by three-dimensionally rotating the representation of the object.

14. The verification device of claim 13,
wherein the representation of at least one object of the plurality of objects comprises at least one of a visualization of a model of the object, a visualization of a two-dimensional model of the object, a visualization of a three-dimensional model of the object, a drawing illustrating the object, a photo showing the object and a video showing the object.

15. The verification device of claim 13,
wherein the property of each object of the plurality of objects comprises at least one of a size of the object, a speed of the object, an age of the object, a maximum travel distance of the object, a maximum flight height of the object, a temperature of the object, a geographical location of the object, a latitude of the object, a longitude of the object, an altitude of the object, a mass of the object, a price of the object, a power of the object, a computing power of the object, a brightness of the object, a popularity of the object, a wind resistance of the object and a flexibility of the object.

16. The verification device of claim 13,
wherein the object comprises at least one of a person, an animal, a microorganism, a virus, an article, a building, a place, a city, a vehicle, a motorized vehicle, a car, a truck, a computer and a mobile phone.

17. The verification device of claim 13,
wherein the display circuit is further configured to change the appearance by at least one of translating the representation of the object, scaling the representation of the object, changing an illumination of the representation of the object, changing a coloring of the representation of the object and changing a background of the representation of the object.

18. The verification device of claim 17,
wherein changing the background of the representation of the object comprises cluttering the background.

19. The verification device of claim 13,
wherein the verification method comprises a CAPTCHA device.

20. A non-transient computer readable medium including program instructions which when executed by a processor cause the processor to perform a verification method comprising:
determining a plurality of objects, each object having a property;
displaying a representation of each object of the plurality of objects;
receiving from a user an input indicating a sequence of the plurality of objects;
determining a sequence of the properties of the plurality of objects; and
comparing the input with the sequence of the properties of the objects;
wherein displaying a representation of each object of the plurality of objects comprises changing an appearance of the representation of the object and displaying the representation of the object with the changed appearance; and
wherein changing the appearance comprises three-dimensionally rotating the representation of the object.

21. The verification method of claim 1, wherein three-dimensionally rotating the representation of the object comprises three-dimensionally rotating the representation of the object by 20 to 340 degrees.

22. The verification device of claim 13, wherein three-dimensionally rotating the representation of the object comprises three-dimensionally rotating the representation of the object by 20 to 340 degrees.

23. The verification method of claim 1, wherein changing the appearance further comprises two or more of translating the representation of the object, scaling the representation of the object, changing an illumination of the representation of the object, changing a coloring of the representation of the object and changing a background of the representation of the object.

24. The verification device of claim 13, wherein the display circuit is further configured to change the appearance by two or more of translating the representation of the object, scaling the representation of the object, changing an illumination of the representation of the object, changing a coloring of the representation of the object and changing a background of the representation of the object.

* * * * *